United States Patent
Komura et al.

(10) Patent No.: US 6,260,145 B1
(45) Date of Patent: *Jul. 10, 2001

(54) SYSTEM AND METHOD OF AUTHENTICATION OF DIGITAL INFORMATION

(75) Inventors: Masahiro Komura; Etsuo Ono; Yasutsugu Kuroda; Satoru Torii, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,152

(22) Filed: Jul. 29, 1997

(30) Foreign Application Priority Data

Feb. 14, 1997 (JP) .................................................. 9-030868

(51) Int. Cl.⁷ ....................................................... H04L 9/00
(52) U.S. Cl. ............................ 713/176; 713/179; 713/157
(58) Field of Search ....................... 380/25, 30; 713/176, 713/153, 179, 181, 157, 180

(56) References Cited

U.S. PATENT DOCUMENTS

| | | | |
|---|---|---|---|
| 4,219,151 * | 8/1980 | Haruki ................................. | 235/379 |
| 4,450,535 * | 5/1984 | Pommery et al. .................... | 364/900 |
| 4,679,236 * | 7/1987 | Davies .................................. | 380/23 |
| 5,276,737 * | 1/1994 | Micali ................................... | 380/30 |
| 5,390,247 * | 2/1995 | Fischer ................................. | 380/25 |
| 5,455,865 * | 10/1995 | Perlman ............................... | 713/153 |
| 5,465,299 * | 11/1995 | Matsumoto et al. ................. | 713/176 |
| 5,606,609 * | 2/1997 | Houser et al. ........................ | 380/4 |
| 5,608,721 * | 3/1997 | Natarajan et al. .................... | 370/238 |
| 5,610,982 * | 3/1997 | Micali ................................... | 380/25 |
| 5,638,447 * | 6/1997 | Micali ................................... | 380/25 |
| 5,748,960 * | 5/1998 | Fischer ................................. | 395/683 |
| 5,754,659 * | 5/1998 | Sprunk et al. ........................ | 380/30 |
| 5,787,172 * | 7/1998 | Arnold ................................. | 380/21 |
| 5,825,880 * | 10/1998 | Sudia et al. .......................... | 380/21 |

* cited by examiner

*Primary Examiner*—Tod Swann
*Assistant Examiner*—Stephen Kabakoff
(74) *Attorney, Agent, or Firm*—Staas & Halsey LLP

(57) ABSTRACT

In an authentication system for companies, a server appends suitable verification data to an electronic document to be circulated through terminal units for persons in charge. Each terminal is allocated a unique function in advance and applies it to the verification data in turn when receiving the document. Upon receipt of the document that has been circulated through the persons in charge, the server examines the function-applied value appended to the document to determine whether the document has been circulated correctly through the persons in charge, or via the correct route.

25 Claims, 17 Drawing Sheets

| PROCEDURE | COMMUNICATIONS DATA | | |
|---|---|---|---|
| P1 | DOCUMENT | | |
| P2 | ID | VALUE | DIGITAL SIGNATURE 0 |
| P3 | DOCUMENT, ID | FUNCTION 1 (VALUE) | DIGITAL SIGNATURE 0, DIGITAL SIGNATURE 1 |
| P4 | DOCUMENT, ID | FUNCTION 2 (FUNCTION 1 (VALUE)) | DIGITAL SIGNATURE 0, DIGITAL SIGNATURE 1, DIGITAL SIGNATURE 2 |
| P5 | DOCUMENT, ID | FUNCTION 3 (FUNCTION 2 (FUNCTION 1 (VALUE))) | DIGITAL SIGNATURE 0, DIGITAL SIGNATURE 1, DIGITAL SIGNATURE 2, DIGITAL SIGNATURE 3 |

| DOCUMENT TYPE | SENDER | RECIPIENT | FUNCTION |
| --- | --- | --- | --- |
| DOC. 1 | PERSON 1 | PERSON 2 | FUNCTION 1 |
| DOC. 1 | PERSON 2 | PERSON 3 | FUNCTION 2 |
| DOC. 1 | PERSON 3 | SERVER | FUNCTION 3 |

| PROCEDURE | COMMUNICATIONS DATA | | |
|---|---|---|---|
| | DOCUMENT ID | VALUE | |
| P1 | | | |
| P2 | | | |
| P3 | DOCUMENT, ID | FUNCTION1 (VALUE) | DIGITAL SIGNATURE 1 |
| P4 | DOCUMENT, ID | FUNCTION2 (FUNCTION1 (VALUE)) | DIGITAL SIGNATURE 1, DIGITAL SIGNATURE 2 |
| P5 | DOCUMENT, ID | FUNCTION3 (FUNCTION2 (FUNCTION1 (VALUE))) | DIGITAL SIGNATURE 1, DIGITAL SIGNATURE 2, DIGITAL SIGNATURE 3 |

F I G. 4

| ID | CONFIDETIAL INFORMATION |
|----|------------------------|
| 1  | FUNCTION 3 (FUNCTION 2 (FUNCTION 1 (VALUE))) |

⋮

F I G. 5

| PROCEDURE | DOCUMENT | COMMUNICATIONS DATA | |
|---|---|---|---|
| | DOCUMENT ID | VALUE | |
| P1 | | | DIGITAL SIGNATURE 0 |
| P2 | ID | FUNCTION 1 (VALUE) | DIGITAL SIGNATURE 0, DIGITAL SIGNATURE 1 |
| P3 | DOCUMENT, ID | FUNCTION 2 (FUNCTION 1 (VALUE)) | DIGITAL SIGNATURE 0, DIGITAL SIGNATURE 1, DIGITAL SIGNATURE 2 |
| P4 | DOCUMENT, ID | FUNCTION 3 (FUNCTION 2 (FUNCTION 1 (VALUE))) | DIGITAL SIGNATURE 0, DIGITAL SIGNATURE 1, DIGITAL SIGNATURE 2 |
| P5 | DOCUMENT, ID | | DIGITAL SIGNATURE 0, DIGITAL SIGNATURE 1, DIGITAL SIGNATURE 2, DIGITAL SIGNATURE 3 |

F I G. 6

SYSTEM AND METHOD OF AUTHENTICATION OF DIGITAL INFORMATION

BACKGROUND OF THE INVENTION

1. Field of the Invention

The present invention relates to an authentication system and method which, when electronic transactions are conducted between organizations, verifies that a document has been transferred through an authorized creator and approvers and appends the representative's digital signature to the document that has been circulated via the correct route.

2. Description of the Related Art

In recent years, companies have been confronted by a problem of illegal transactions by their employees. The recent illegal transactions show a tendency for a sharp increase in the sum of money involved and to become longer in term. The prevention of illegal transactions is one of the important problems which confronts companies. With the recent spread of the Internet, there is a trend toward conducting electronic transactions between companies. In such electronic transactions, the prevention of illegal transactions is necessary.

With the electronic transactions, the development of authentication technologies utilizing recent cryptographic techniques enables electronic authentication of individuals on a computer network. For example, for a user A to send a document to a user B, the user A appends his or her digital signature to that document. The user B who receives the document can then confirm that the received document was one created by the user A by verifying the digital signature of the user A.

However, the network-based electronic transactions have the following problems.

By utilizing an authentication technology for intra-company documents, persons in charge of handling a document, such as a creator and an approver of that document, can be identified. The authentication technology is merely adapted to identify each individual. That is, although the person who created the document can be identified, it is impossible to determine whether that person really has authority to create the document. Likewise, although the person who approved the document can be identified, it is impossible to determine whether that person is really authorized to approve the document.

With documents that are communicated within a company, mere identification of persons who handled a document is not sufficient; it is important whether or not the persons who handled the document are authorized to handle it.

In electronic transactions between companies, assume that a company A sends a document to a company B. Then, the company A will append the representative's digital signature to that document in order to indicate that it was definitely created by the company A. The company B can verify the digital signature appended to the received document to confirm that the document was definitely created by the company A.

If the company A gives means of appending the representative's digital signature to a person in charge of creating or inspecting documents, there will arise the possibility that this person may append the representative's digital signature even to documents which are not related to his or her duties, to thereby perform illegal transactions. In order to conduct secure electronic transactions between companies, therefore, it is required for a document-sending company to install such a system as allows the representative's digital signature to be attached to a document immediately prior to transmission of it.

SUMMARY OF THE INVENTION

It is an object of the present invention to provide an authentication system and method which systematically verifies that a person who handles a document has authority to handle it, and automatically appends the representative's digital signature to the verified document to thereby prevent illegal transactions.

The authentication system of the present invention comprises an authentication apparatus and terminal units of respective persons in charge, which are all configured for a communications network.

In a first aspect of the present invention, the authentication apparatus is equipped with a confidential information storage unit and a verification unit. The confidential information storage unit stores confidential information corresponding to digital information to be circulated, and the verification unit verifies on the basis of the confidential information and information appended to the digital information that the digital information has been circulated correctly, or via the correct route.

As the confidential information, for example, use is made of the result of the application of each of the functions that have been allocated to the persons in charge who handle the digital information to the verification data, in the sequence in which the information is to be circulated through the persons in charge.

The digital information is transmitted outside of the company with the representative's digital signature appended only when a match occurs between the confidential information and information appended to the digital information. In this manner, illegal transactions by employees are prevented.

In a second aspect of the present invention, each terminal unit is equipped with a communications unit and a conversion unit. The communications unit receives the digital information to be circulated and sends it to the next terminal unit. At this point, the conversion unit converts the information appended to the digital information in accordance with an algorithm allocated to the corresponding person in charge. For example, the above-described allocated function may be used as the algorithm.

In a third aspect of the present invention, the authentication apparatus is equipped with a communications unit and a verification unit in order to circulate information relating to intercompany transactions through one or more persons in charge within a company. The communications unit receives digital information that have been circulated through the persons in charge and the verification unit verifies that the digital information has been circulated correctly on the basis of information appended to the digital information.

BRIEF DESCRIPTION OF THE DRAWINGS

FIG. 3 shows data in the function storage unit of FIG. 2;

FIG. 4 shows first communications data;

FIG. 5 shows data in the confidential information storage unit of FIG. 2;

FIG. 6 shows second communications data;

DESCRIPTION OF THE PREFERRED EMBODIMENT

Figure 1:
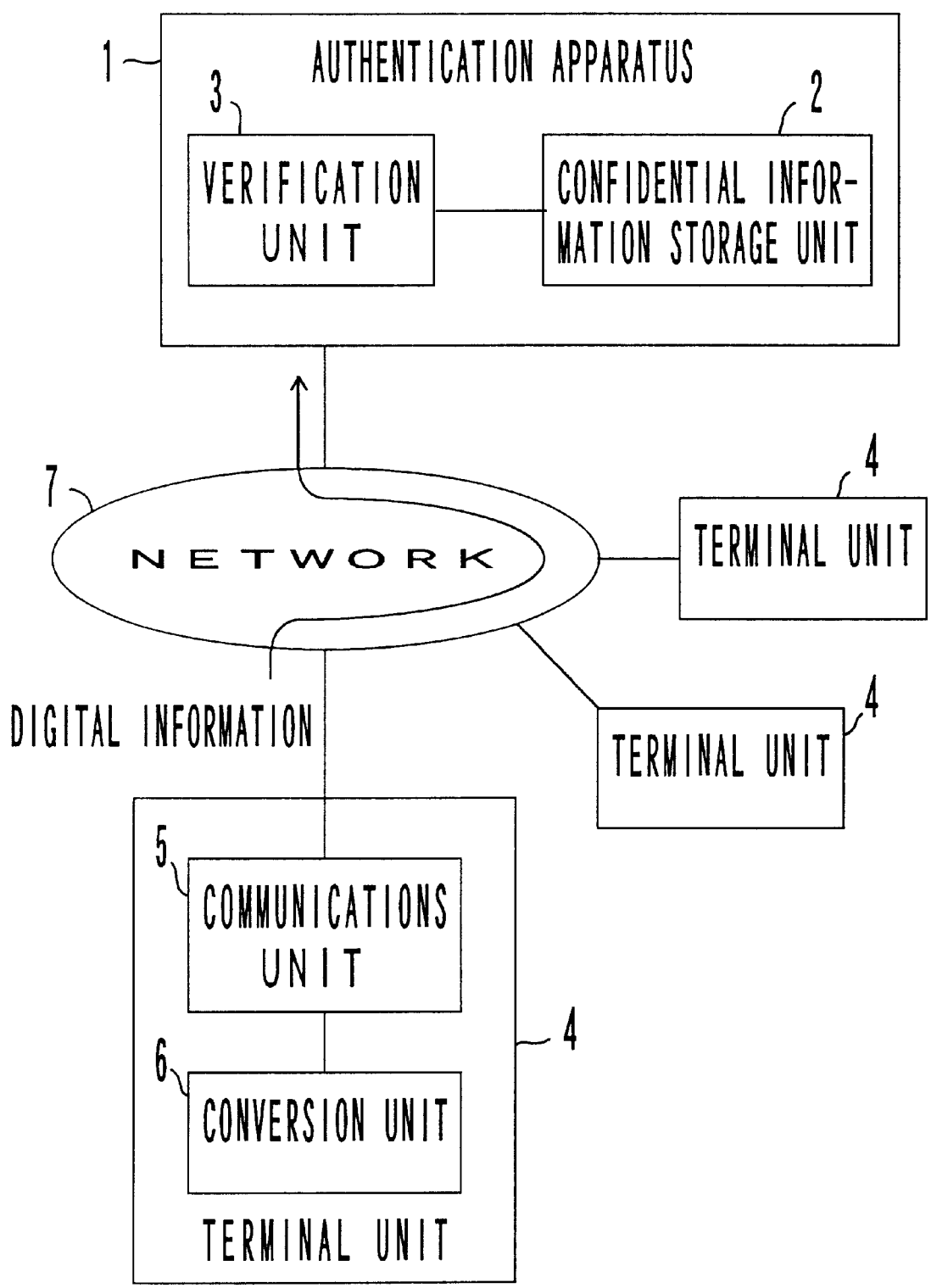
FIG. 1 is a schematic diagram of the principles of an authentication system of the present invention.

FIG. 1 illustrates the principles of an authentication system according to the present invention. This authentication system comprises an authentication apparatus 1 and terminal units 4, which are all configured for a communications network 7. The authentication apparatus 1 is equipped with a confidential information storage unit 2 and a verification unit 3, and each of the terminal units 4 is equipped with a communications unit 5 and a conversion unit 6.

The confidential information storage unit 2 is adapted to store confidential information for digital information to be circulated. On the basis of the confidential information and information appended to that digital information, the verification unit 3 verifies that the digital information was circulated through the persons in charge in the correct sequence.

On the network 7, items of digital information, such as document data, image date, etc., are circulated through the persons in charge who are concerned with that information. The confidential information storage unit 2 stores in advance confidential information for each piece of digital information in such a way that this confidential information is not known to the persons in charge. Upon receipt of the digital information circulated through the terminals of the persons in charge, the verification unit 3 extracts information appended to the digital information and then verifies the route on the basis of that information and the confidential information.

As confidential information, use is made of the results of the application of a function or functions allocated to one or more persons in charge of handling digital information to the data for verification, in the order in which the information is circulated through the persons in charge. While the digital information with the verification data appended is being forwarded to each of the persons in charge in sequence, each terminal unit 4 applies its corresponding function to the verification data. The final result of the application of the one or more functions to the verification data is compared with the confidential information, thereby determining whether the digital information has taken the correct route.

If the comparison does not indicate equality, then the digital information is considered to have been forwarded to a person who has no authority to handle it, or to have taken a route that has a different sequence from the required one. In such a case, the process to transmit the digital information outside of the company can be stopped.

It is allowed to append the representative's digital signature to the digital information and send it outside of the company only when the confidential information matches the information appended to the digital information. In this manner, illegal transactions by employees can be prevented.

The communications unit 5 in the terminal unit 4 receives the digital information to be circulated and routes it to the next terminal. At this point, the conversion unit 6 converts the information appended to the received digital information in accordance with an algorithm allocated to a specific person in charge. Here, the specific person in charge refers to one allocated to a corresponding respective one of the terminal units 4. The conversion unit 6 converts the information appended to the digital information in accordance with a specific data converting algorithm allocated in advance to the corresponding person in charge. As the data converting algorithm, the above-described function is used, by way of example.

The converted information is appended to the digital information and sent to the next terminal unit 4 by the communications unit 5. In the next terminal unit, the appended information is subjected to conversion by another data converting algorithm. In this way, the appended information is converted in turn by the data converting algorithms while the digital information is circulated through the persons in charge. Eventually the information is converted to information particular to the circulating route. The authentication apparatus 1 then examines the information to determine whether the digital information has taken the correct route.

Only when the information appended to the digital information indicates that the correct route was taken, is it allowed to send outside of the company the digital information with the representative's digital signature appended. In this way, illegal transactions by employees can be prevented.

Figure 2:
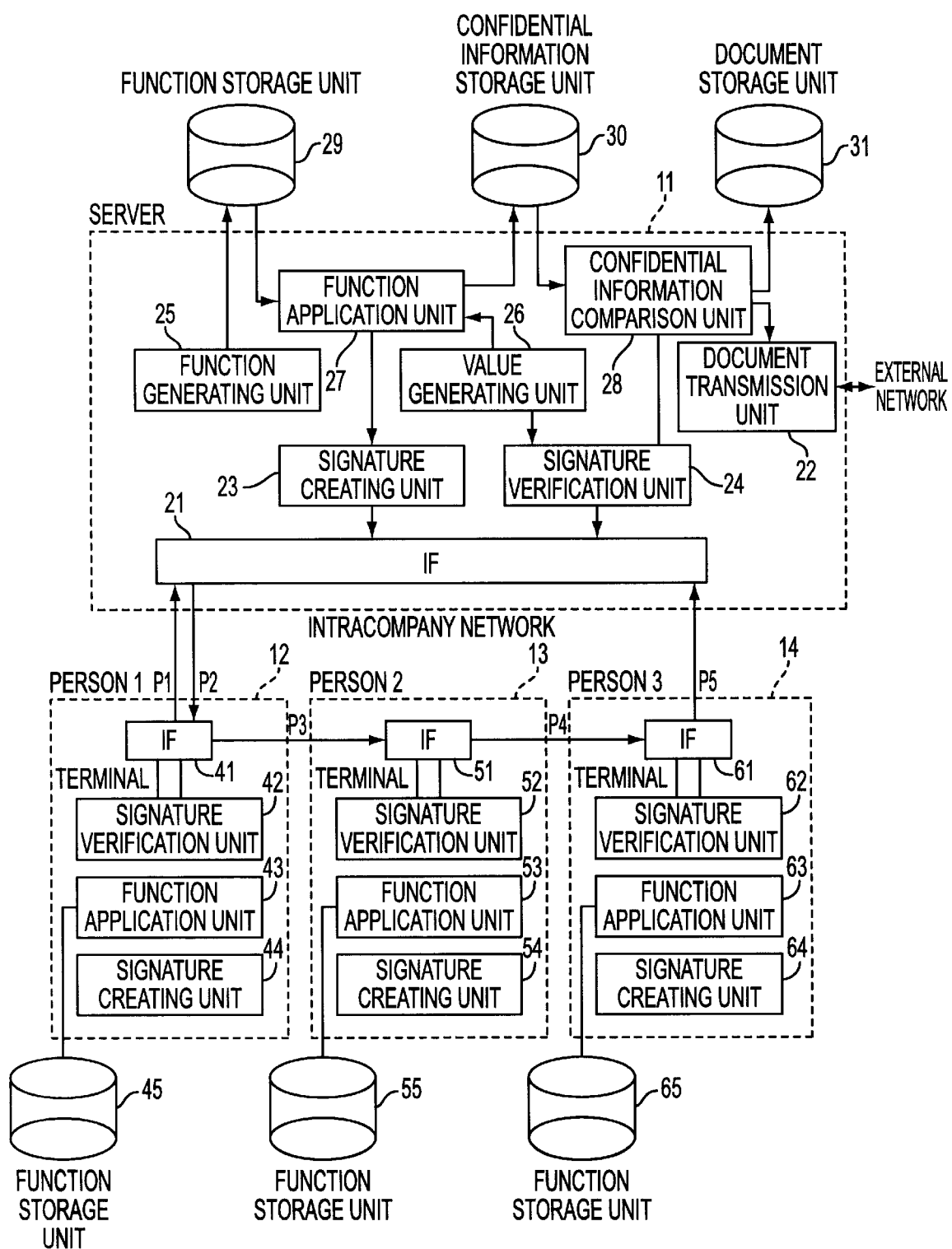
FIG. 2 is a schematic diagram of the authentication system.

For example, the authentication apparatus 1 of FIG. 1 corresponds to a server 11 in FIG. 2, the confidential information storage unit 2 to a confidential information storage unit 30, and the verification unit 3 to a confidential information comparison unit 28. In addition, the communications unit 5 corresponds to interfaces 41, 51 and 61, and the conversion unit 6 to function application units 43, 53 and 63.

In the authentication system of the present invention, in order to allow secure electronic transactions to be conducted between companies, the company that sends a document appends the representative's digital signature to that document only when it was circulated through an authorized document creator and an authorized document approver or approvers.

To this end, the server distributes a specific function in advance to each of the terminals allocated to the persons in charge, and issues suitable verification data together with a document (digital information). Each terminal in turn applies the given function to the incoming data and sends the result to the next terminal as a function value. The server makes a comparison between the function value sent from the last terminal and the result of application of the functions allocated to the persons in charge to the original data, in the sequence in which the data is forwarded to each terminal, to thereby verify the circulating route of the digital information.

If the comparison indicates equality, then it is decided that the document has been circulated over the given route, and the document is issued outside of the company with the representative's digital signature appended. In this manner, by using functions and verification data that are known only to the server, a check is made to ensure that the document has been circulated through the authorized persons in charge, and the authority of each person in charge is verified. It is only the server that appends the representative's digital signature to the document, which prevents illegal use of the digital signature by the persons in charge.

The digital signature refers to information created by encrypting data in some way by using a secret key that is not known publicly. An example of a way for the data recipient to verify the originator's identity is to decrypt the digital signature using a public key described in a certificate published by an authentication office, and verify its contents. The secret key used to create the digital signature and the public key described in the certificate are paired with each other, so that data encrypted by using the secret key can be decrypted by using the public key.

FIG. 2 is a schematic diagram of the authentication system of the present invention. This system includes a server 11 and terminals 12, 13 and 14 allocated to the persons in charge, and is connected to an external communications network.

The server 11 includes an interface (IF) 21, a document transmission unit 22, a signature creating unit 23, a signature verification unit 24, a function generating unit 25, a value generating unit 26, a function application unit 27, and a confidential information comparison unit 28. To the server 11 are connected a function storage unit 29, a confidential information storage unit 30, and a document storage unit 31.

The terminal 12 of the person in charge 1 includes an interface 41, a signature verification unit 42, a function application unit 43, and a signature creating unit 44. The terminal 13 of the person in charge 2 includes an interface 51, a signature verification unit 52, a function application unit 53, and a signature creating unit 54. The terminal 14 of the person in charge 3 includes an interface 61, a signature verification unit 62, a function application unit 63, and a signature creating unit 64.

The terminals 12, 13 and 14 are connected to the function storage units 45, 55 and 65, respectively. The server 11 and the terminals 12, 13 and 14 are interconnected by an intra-company or internal network. In general, any number of terminals can be installed. Even with four or more terminals installed, each terminal has the same arrangement as above.

Hereinafter, the operation of verifying the circulation of a document through the terminals and the transmission of it outside of the company in the authentication system thus arranged, will be described in terms of an example where that document is sent from person 1 through person 2 to person 3.

Before sending a document, the server 11 generates in the function generating unit 25 a separate function for each of the persons in charge 1, 2 and 3, and distributes each of the functions thus generated to the individual person in charge in such a way that it will not be known to the other persons. The persons in charge 1, 2 and 3 store their own functions in their associated function storage units 45, 55 and 65, respectively.

The server 11 stores the functions in its associated function storage unit 29. At this point, the server sets up a table that includes the document type, the sender, the recipient, and the function according to the route of the document as shown in FIG. 3, and uses it for a route search when receiving from a sender notification that a document has been created. Here, functions 1, 2 and 3 are assigned to the persons in charge 1, 2 and 3, respectively. The document 1 is supposed to take the route from the person 1 through the persons 2 and 3 to the server.

FIG. 4 is a table of communications data that are communicated among the server 11 and the terminals before a document is actually transmitted outside the company. When the person in charge 1 starts to circulate a document, in procedure P1, the terminal 12 sends a created document from its interface 41 to the interface 21 of the server 11.

The value generating unit 26 in the server 11 generates an ID code for the received document and a value that is known to only the server 11. When only one type of document is handled, the ID code need not necessarily be generated and can be omitted in the following processing. The value may be generated randomly or may be part of the document or ID code.

Next, the server 11 searches the function storage unit 29 for the route of the document on the basis of information about the type of the document and the sender, and then, in the function application unit 27, applies each of the functions assigned to the persons in charge on the route to that value generated by the value generating unit 26, in sequence. The resultant value is then stored in the confidential information storage unit 30 together with the ID code generated by the value generating unit 26 as shown in FIG. 5.

In procedure P2, the server 11 sends the ID code and the value generated by the value generating unit 26 from its interface 21 to the interface 41 of the terminal 12. The function application unit 43 that accepted the value via the interface 41 applies the function 1 stored in the function storage unit 45 to that value. The signature creating unit 44 then appends a digital signature 1 to the document, the ID code, and the "function 1 (value)"(function-applied value) that is the result of application of the function 1 to the value.

Thus, it is preferable that the digital signature of the person in charge be appended to the entire data containing the document, the ID, and the function-applied value. However, it is also possible to append the digital signature to part of that data.

In procedure P3, the terminal 12 sends the document, the ID code, the function-applied value, and the digital signature 1 from its interface 41 to the interface 51 of the terminal 13. Upon receipt of the information via the interface 51, the signature verification unit 52 verifies the digital signature appended by the person in charge 1.

If the digital signature is verified as that appended by the person in charge 1, the function application unit 53 applies the function 2 stored in the function storage unit 55 to the received function-applied value. The signature creating unit 54 then appends the digital signature 2 to the document, the ID code, and the function-applied value "function 2 (function 1 (value)).".

In procedure P4, the terminal 13 sends the document, the ID code, the function-applied value, the digital signature 1, and the digital signature 2 from its interface 51 to the interface 61 of the next terminal 14. Upon receiving the information via the interface 61, the signature verification unit 62 verifies the digital signature 2 appended by the person in charge 2.

If the digital signature is verified as that appended by the person in charge 2, the function application unit 63 applies the function 3 stored in the function storage unit 65 to the received function-applied value. The signature creating unit 64 then appends the digital signature 3 to the document, the ID code, and the function-applied value "function 3 (function 2 (function 1 (value)))."

In procedure P5, the terminal 14 sends the document, the ID code, the function-applied value, the digital signature 1, the digital signature 2, and the digital signature 3 from its interface 61 to the interface 21 of the server 11. Upon receiving the information via the interface 21, the signature verification unit 24 verifies the digital signature 3 appended by the person in charge 3.

If the digital signature is verified as that appended by the person in charge 3, then the confidential information comparison unit 28 makes a comparison between the function-applied value sent from the person in charge 3 and the confidential information stored in the confidential information storage unit 30. If the comparison indicates equality, the server 11 considers the document to have been sent via the proper route and then stores the document, the digital signature 1, the digital signature 2, and the digital signature 3 in the document storage unit 31. The document transmission unit 22 then transmits the document with the representative's digital signature appended outside of the company.

In this system, the function 1, the function 2 and the function 3, generated by the server 11, are respectively passed to the person 1, the person 2 and the person 3 and stored in their respective function storage units 45, 55 and 65, in such a way that they are not known to each of the persons.

As methods of distributing the functions to the persons in charge, there is a method in which portable storage mediums, such as integrated circuit (IC) cards, are used as the function storage units and they are passed to the persons in charge off-line, a method in which the server 11 and each of the terminals are connected together with dedicated lines, the security of which is assured, and the functions are distributed to the terminals on-line, and so on. With the IC cards, the system will offer an advantage that the function storage units can be removed with ease.

Moreover, the server 11 circulates a document through the persons in charge with a randomly generated value appended, and each of the persons in charge applies their own function given in advance by the server to that value, allowing the value to be converted to a particular value which can be generated only by the person in charge.

Each of the persons in charge performs the same processing, so that the document and a value that has been subjected to sequential conversion by the functions are returned to the server 11. The server 11 stores the functions respectively assigned to the persons in charge in the function storage unit 29, and makes a comparison between a value obtained by applying each of the functions in the function storage unit 29 to the randomly generated value in sequence, and a value obtained by each of the persons in charge applying his or her own function to the value appended to the document (the original value or the function-applied value from the preceding terminal) in sequence, while the document is being circulated. The comparison allows a determination to be made as to whether the document has been circulated through the person in charge 1, the person 2, and the person 3, in this sequence.

Moreover, even if, when the server-generated functions are each stored in the respective function storage units 45, 55 and 65 in such a way that they are kept secret from the persons in charge, any one of the persons is transferred to another place as a result of personnel changes, the same function is automatically allocated to a new person in charge. The allocation of a unique function for each post or function (as opposed to each person) in the company allows the system to adapt itself to personnel changes.

Furthermore, the system can accommodate the temporary absence of a person in charge by giving the function, including the function storage unit, to an acting person in charge. In particular, when removable IC cards are used as the function storage units, the person in charge simply gives the IC card to the acting person in charge.

In addition, the functions are kept secret from other persons in charge, which prevents any person in charge from impersonating another person in charge allocated a function. In this case, each person cannot apply the function of another person to the received value, thus making it impossible to make a document look as if it had been properly circulated.

Although each function is allocated to a respective individual post, each digital signature is uniquely given to a respective individual person in charge. Thus, the digital signatures are subject to change with personnel changes. By circulating a document with digital signatures of persons in charge appended, the persons who handled that document can be identified easily in the case where some problems arise.

Referring back to FIG. 4, in procedure P1 the value generating unit 26 can generate a hash value for the received document to use it as a value for verification. Thereby, fraudulent document substitution by the person in charge 1 who created that document can be prevented, improving the system reliability.

In procedure P2, the signature creating unit 23 in the server 11 can send to the terminal 12 its ID code and a value with its own digital signature 0 appended. In this case, the communications data in each procedure shown in FIG. 4 will vary as shown in FIG. 6, and the signature verification unit 42 in the terminal 12 will verify the digital signature 0 of the server. If the digital signature 0 of the server is verified, then the function application unit 43 will apply the function 1 to the received value.

Figure 7:
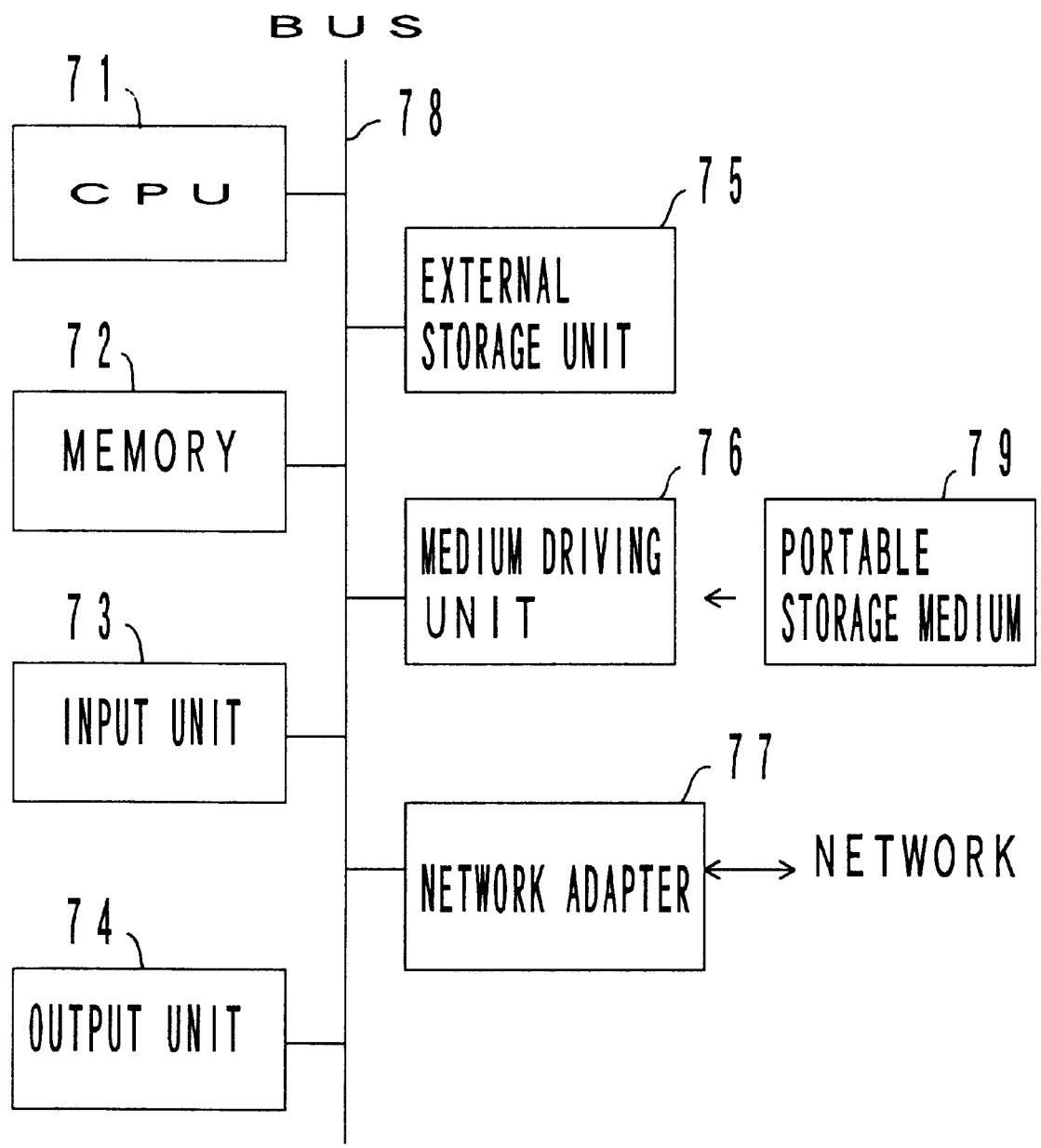
FIG. 7 is a block diagram of an information processing apparatus.

FIG. 7 illustrates in block diagram form an information processing apparatus (a computer) that corresponds to the server 11 or the terminal 12, 13 or 14. The information processing apparatus of FIG. 7 is equipped with a central processing unit (CPU) 71, a memory 72, an input unit 73, an output unit 74, an external storage unit 75, a medium driving unit 76, and a network adapter 77, these components being interconnected by a bus 78.

The CPU 71 carries out programs stored in the memory 72 to implement the processing by the server 11 or the terminal 12, 13 or 14. A read only memory (ROM) or random access memory (RAM) serves as the memory 72.

The input unit 73 corresponds to a keyboard or pointing device and is used for the entry of user commands. The output unit 74 corresponds to a display or printer and is used to inquire of the user and output the results of processing.

The external storage unit 75 is a magnetic disk unit, optical disk unit, or magneto-optical disk unit and can hold programs and data. The external storage unit can also be used as the function storage units 29, 45, 55 and 65, the confidential information storage unit 30, and the document storage unit 31.

The medium driving unit 76 drives a portable storage medium 79 to access to its stored contents. As the portable storage medium 79, use may be made of any type of computer-readable storage medium, such as a memory card (IC card), floppy disk, compact disk read only memory (CD-ROM), optical disk, or magneto-optical disk. The portable storage medium 79 can be used not only as the function storage units 45, 55 and 65, but also to store processing programs for the authentication system.

The network adapter 77 is configured for a communications network such as a local area network (LAN) and performs data conversion required with communications. The information processing apparatus can accept necessary data and programs from other information processing apparatus via the network adapter.

Figure 8:
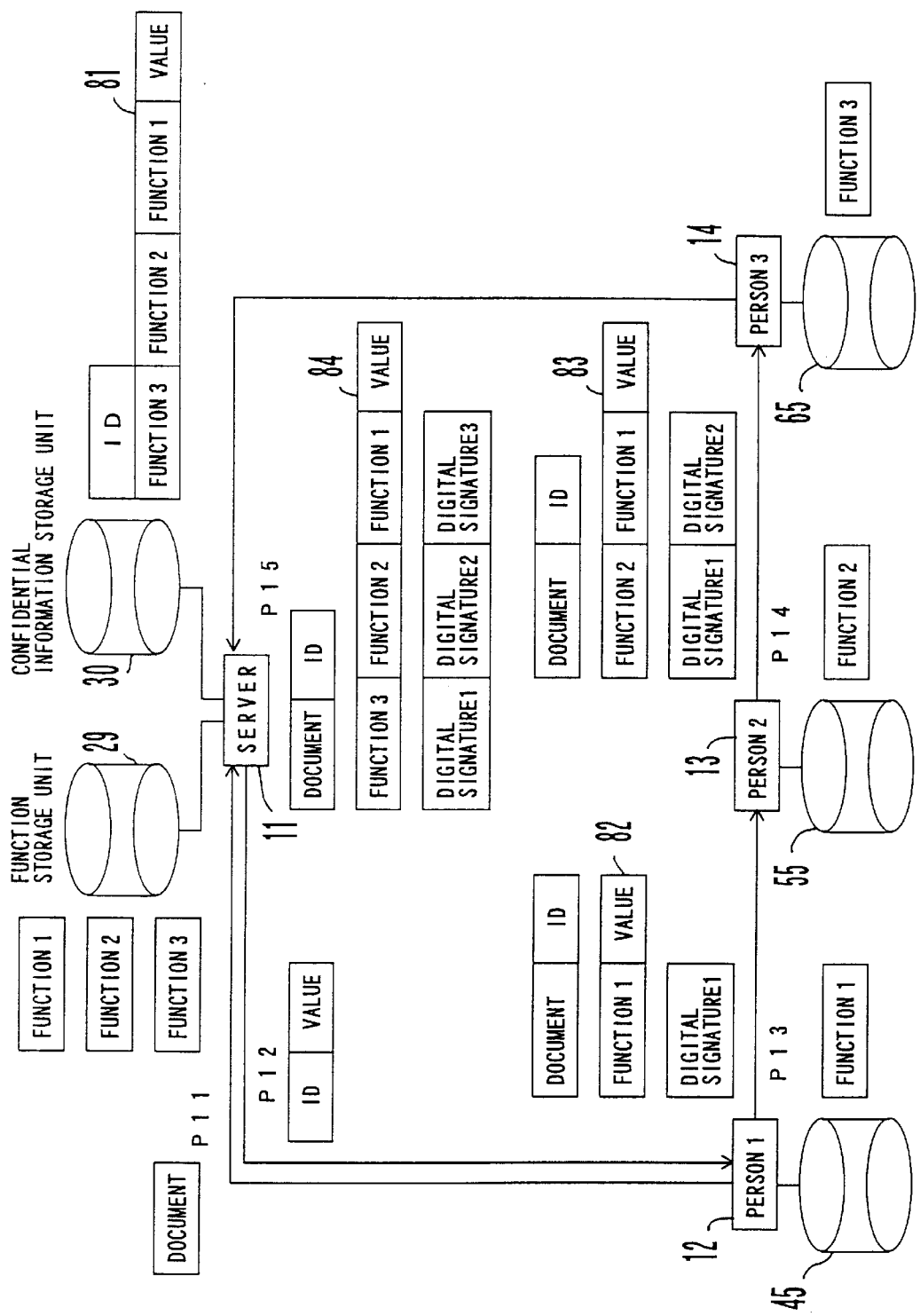
FIG. 8 shows a first embodiment of the authentication system of the present invention.
Figure 9:
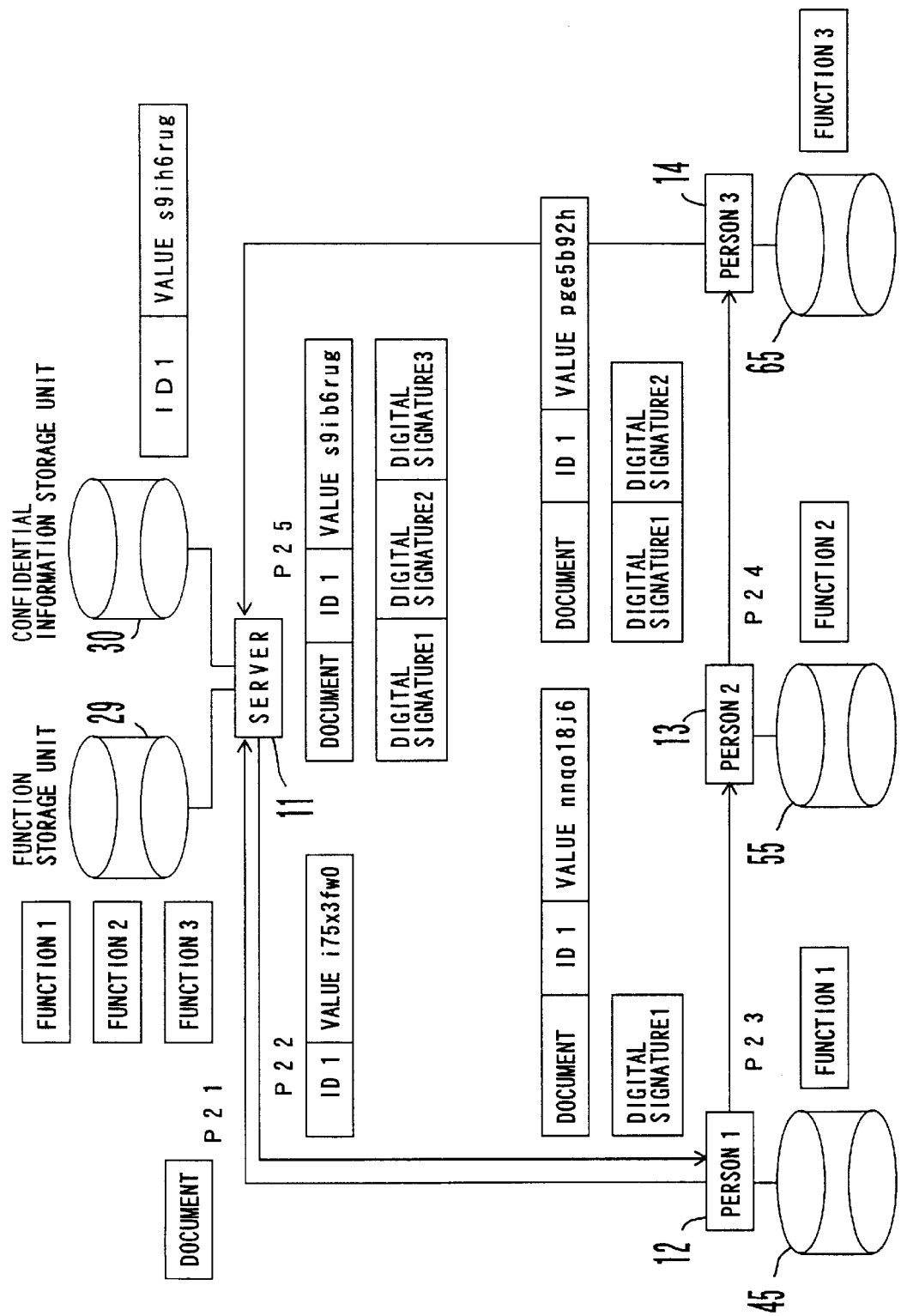
FIG. 9 shows examples of function values.
Figure 10:
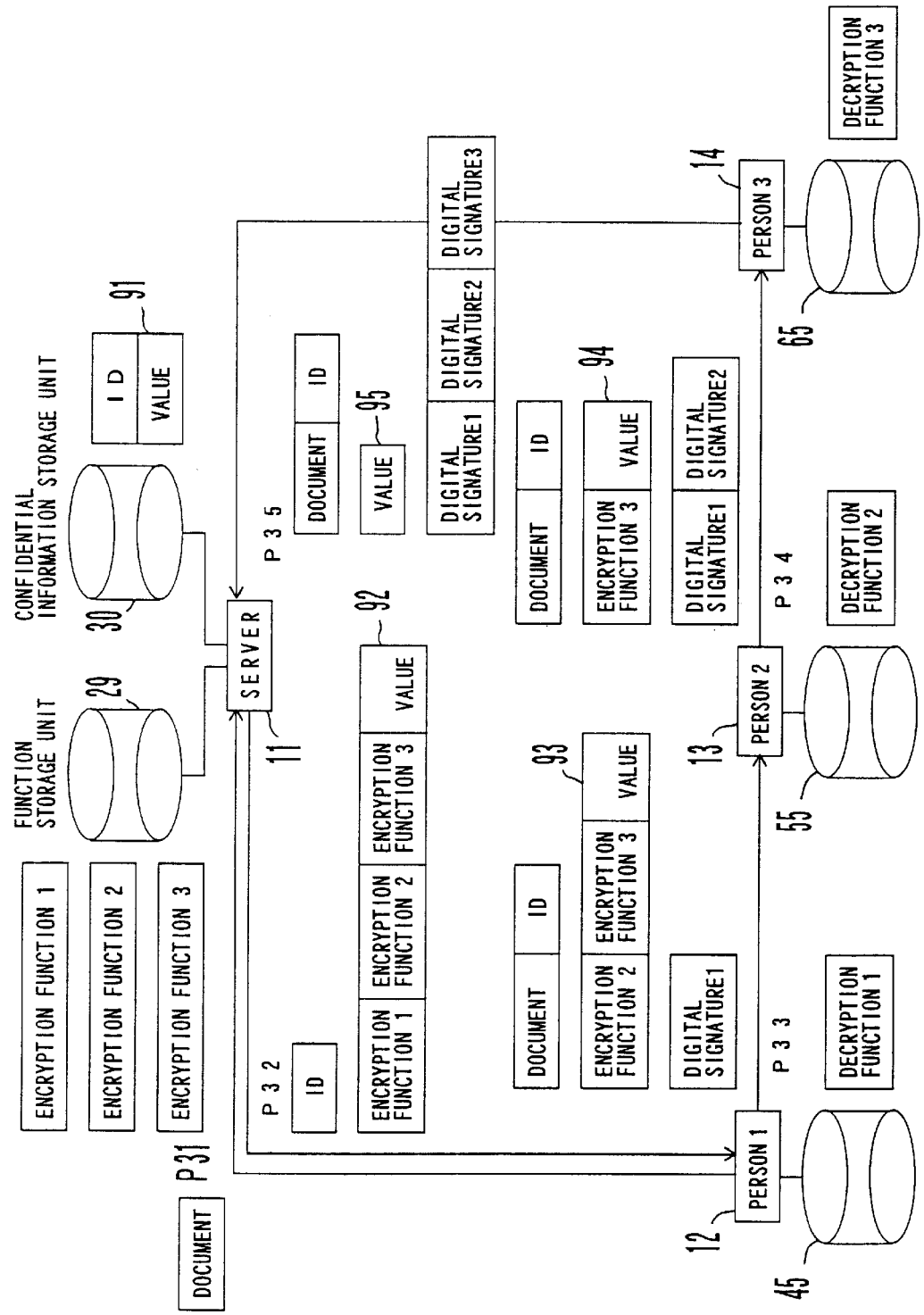
FIG. 10 shows a second embodiment of the authentication system of the present invention.

Reference will next be made to FIG. 8 through FIG. 10 to describe an example of a process by the authentication system of FIG. 2.

FIG. 8 shows an authentication system in which as a function use is made of a hash function or a cryptographic function in the secret key cryptography. The hash function is a unidirectional function for generating data that cannot be restored to its original form by performing operations on given data, and the secret key cryptography uses a secret key cryptographic algorithm such as the DES (Data Encryption Standard).

In the secret key cryptography, the same secret key is used both for encryption and decryption. Unless the key information is known, encryption and decryption cannot be performed. It is supposed here that persons in charge are each given a cryptographic function using a different secret key and none of the persons in charge know the key information. The cryptographic algorithm may vary with the persons in charge or may be the same for all the persons in charge. In FIG. 8, the document creation processing by the person in charge 1 is performed as follows:

P11: the person 1 sends a document to the server 11 to thereby notify it of the document creation.

P12: the server 11 creates a suitable value and then applies each of the functions of the persons in charge to that value in the sequence in which the document is to be circulated through the persons in charge, and stores the result 81 of the application as confidential information in the confidential information storage unit 30 together with an ID code. Like the confidential information shown in FIG. 5, the result 81 of the application indicates a function value of "function 3 (function 2 (function 1 (value))).". The server sends to the terminal 12 of the person in charge 1 the original value prior to the application of the functions together with the ID code. At this point, the server may encrypt the value before sending it to the person 1.

P13: the terminal 12 applies the function 1 to the incoming value and then sends to the terminal 13 of the person in charge 2 the document, the ID code, the result 82 of the application, and the digital signature 1.

P14: the terminal 13 verifies the digital signature 1, applies the function 2 to the incoming value, and then sends to the terminal 14 of the person in charge 3 the document, the ID code, the result 83 of the application, the digital signature 1, and the digital signature 2.

P15: the terminal 14 verifies the digital signature 2, applies the function 3 to the incoming value, and then sends to the server 11 the document, the ID code, the result 84 of the application, the digital signature 1, the digital signature 2, and the digital signature 3. The server 11 makes a comparison between the incoming value 84 and the confidential information 81 stored in the confidential information storage unit 30. When the comparison indicates equality, the server considers the document to have been circulated through the persons in charge in the correct sequence.

FIG. 9 shows specific examples of results (function values) of the application of functions to incoming values in the authentication system of FIG. 8. The process in FIG. 9 is as follows:

P21: the person 1 sends a document to the server 11 to thereby notify it of the document creation.

P22: the server 11 creates a random value "i75×3fw0" and then applies each of the functions of the persons in charge to that value in the sequence in which the document is to be circulated through the persons in charge to thereby obtain a function value of "s9ih6rug". The server then stores that function value as confidential information in the confidential information storage unit 30 together with an ID code "1". The server sends to the terminal 12 of the person in charge 1 the original value "i75×3fw0" prior to the application of the functions together with the ID code "1".

P23: the terminal 12 applies the function 1 to the incoming value "i75×3fw0" to obtain a function value of "nnqol8j6.". The terminal 12 then sends to the terminal 13 of the person in charge 2 the document, the ID code "1" and the function value "nnqol8j6" with the digital signature 1 appended.

P24: the terminal 13 verifies the digital signature 1 and then applies the function 2 to the incoming value "nnqol8j6" to obtain a function value of "pge5b92h.". The terminal 13 then sends to the terminal 14 of the person in charge 3 the document, the ID code "1", and the function value "pge5b92h" with the digital signature 1 and the digital signature 2 appended.

P25: the terminal 14 verifies the digital signature 2 and then applies the function 3 to the incoming value "pge5b92h" to obtain a function value of "s9ih6rug.". The terminal 14 then sends to the server 11 the document, the ID code "1", and the function value "s9ih6rug" with the digital signature 1, the digital signature 2, and the digital signature 3 appended. The server 11 makes a comparison between the incoming value "s9ih6rug" and the confidential information "s9ih6rug" stored in the confidential information storage unit 30. In this case, since the comparison indicates equality, the server considers the document to have been circulated through the persons in charge in the correct sequence.

FIG. 10 shows an authentication system which uses as a function a decryption function in the public key cryptography. The public key cryptography is a system that uses a public key cryptographic algorithm as in the RSA encryption (devised by Rivest, Shamir, and Adleman).

In the public key cryptography, a secret key is used for encryption and a public key is used for decryption. In general, anyone can perform decryption. It is however supposed here that each person in charge is given a decryption function using a different decryption key and none of the persons in charge know the key information. The decryption algorithm may vary with persons in charge or may be the same for all the persons in charge. In FIG. 10, the document creation processing by the person in charge 1 is performed as follows:

P31: the person 1 sends a document to the server 11 to thereby notify it of the document creation.

P32: the server 11 creates a suitable value and then stores it as confidential information 91 in the confidential information storage unit 30 together with an ID code. The server 11 then applies each of the cryptographic functions associated with the persons in charge to that value in the sequence opposite to that in which the document is to be circulated through the persons in charge, and then sends to the terminal 12 of the person in charge 1 the result 92 of the application together with the ID code. The result 92 indicates a function value of "cryptographic function 1 (cryptographic function 2 (cryptographic function 3 (value)))".

P33: the terminal 12 applies its associated decryption function 1 to the incoming function value and then sends to the terminal 13 of the person in charge 2 the document, the ID code, the result 93 of the decryption, and the digital signature 1. The result 93 of the decryption indicates a function value of "cryptographic function 2 (cryptographic function 3 (value))".

P34: the terminal 13 verifies the digital signature 1, applies its associated decryption function 2 to the incoming function value, and then sends to the terminal 14 of the person in charge 3 the document, the ID code, the result 94 of the application, the digital signature 1, and the digital signature 2. The result 94 of the decryption indicates a function value of "cryptographic function 3 (value)".

P35: the terminal 14 verifies the digital signature 2, applies the decryption function 3 to the incoming function value, and then sends to the server 11 the document, the ID code, the result 95 of the application, the digital signature 1, the digital signature 2, and the digital signature 3. The server 11 makes a comparison between the incoming value 95 and the confidential information 91 stored in the confidential information storage unit 30. When the comparison indicates equality, the server 11 considers the document to have been circulated through the persons in charge in the correct sequence.

Thus, by using the public key cryptographic algorithm for the functions assigned to the persons in charge and keeping the key information unknown to the persons in charge, it is made difficult to predict the function of each person in charge including the key information, thereby improving the system reliability.

Next, the flow of processing by the server 11 and each terminal will be described with reference to FIG. 11 through FIG. 17.

Figure 11:
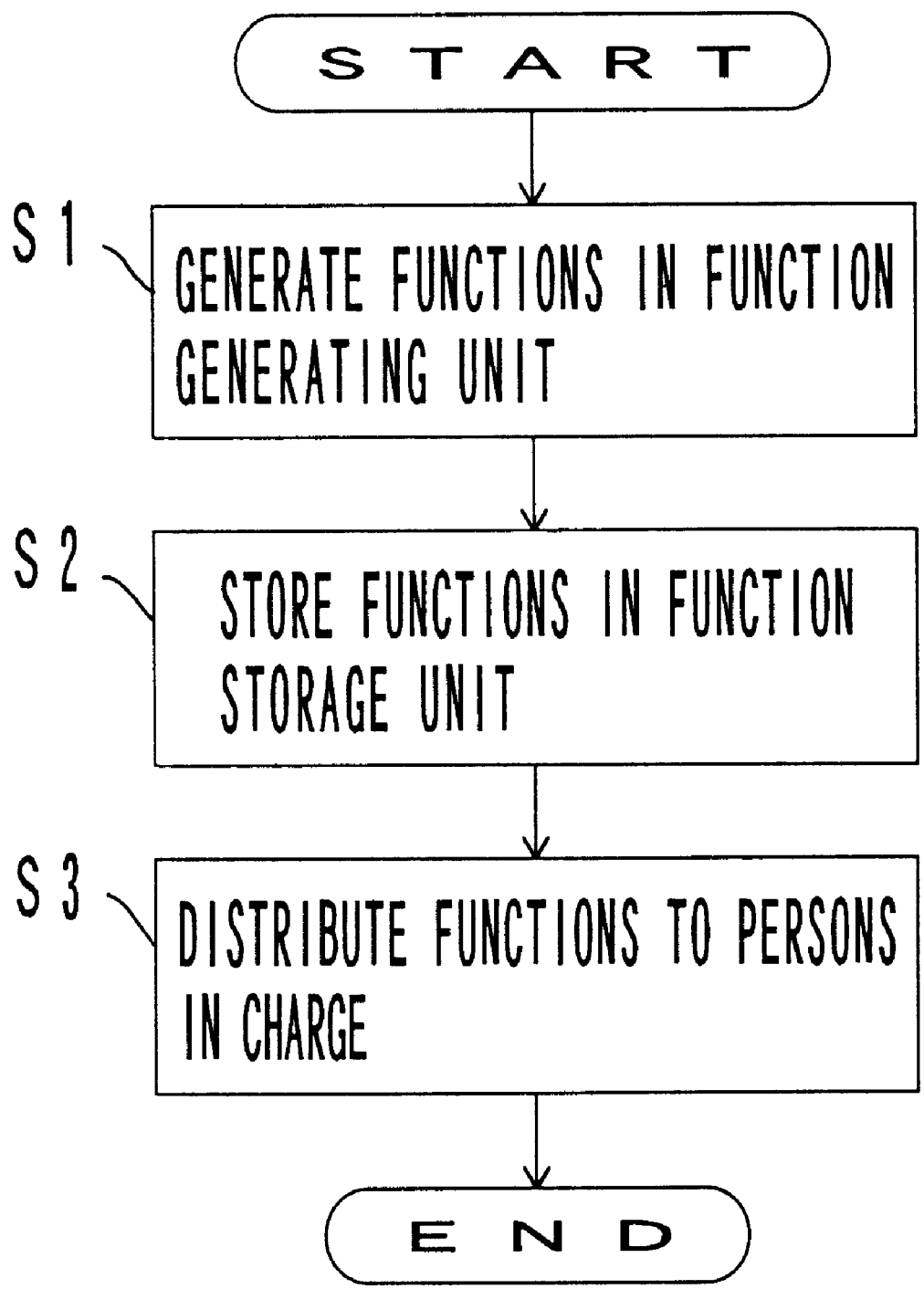
FIG. 11 is a flow diagram for generating a function.

FIG.11 is a flowchart for the function generation processing by the server 11. When the processing is started, the function generating unit 25 generates an individual function for each person in charge (step S1). The server 11 next stores each function in the function storage unit 29 (step S2) and then distributes each function to the corresponding person in charge (step S3), thereby ending the processing.

Figure 12:
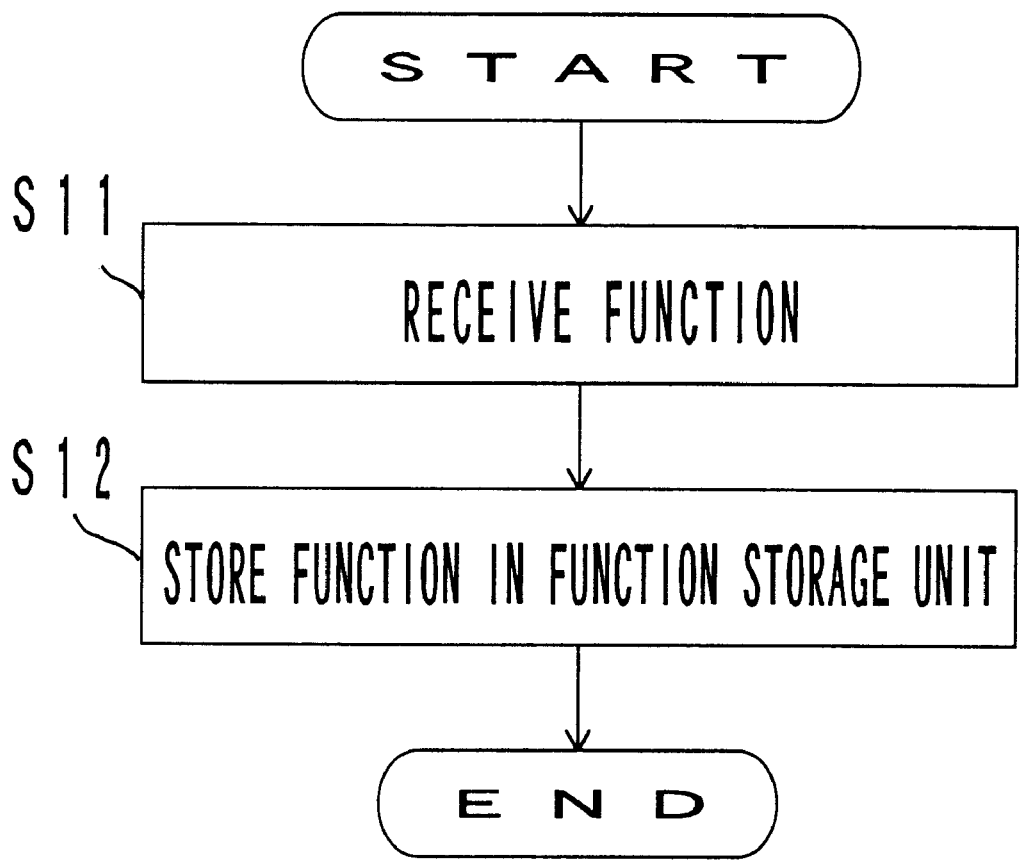
FIG. 12 is a flow diagram for storing the function.

FIG. 12 is a flowchart for the function storage processing by each terminal. When the processing is started, each terminal receives the corresponding function generated by the server (step S11) and then stores it in the corresponding function storage unit (step S12), thereby ending the processing.

Figure 13:
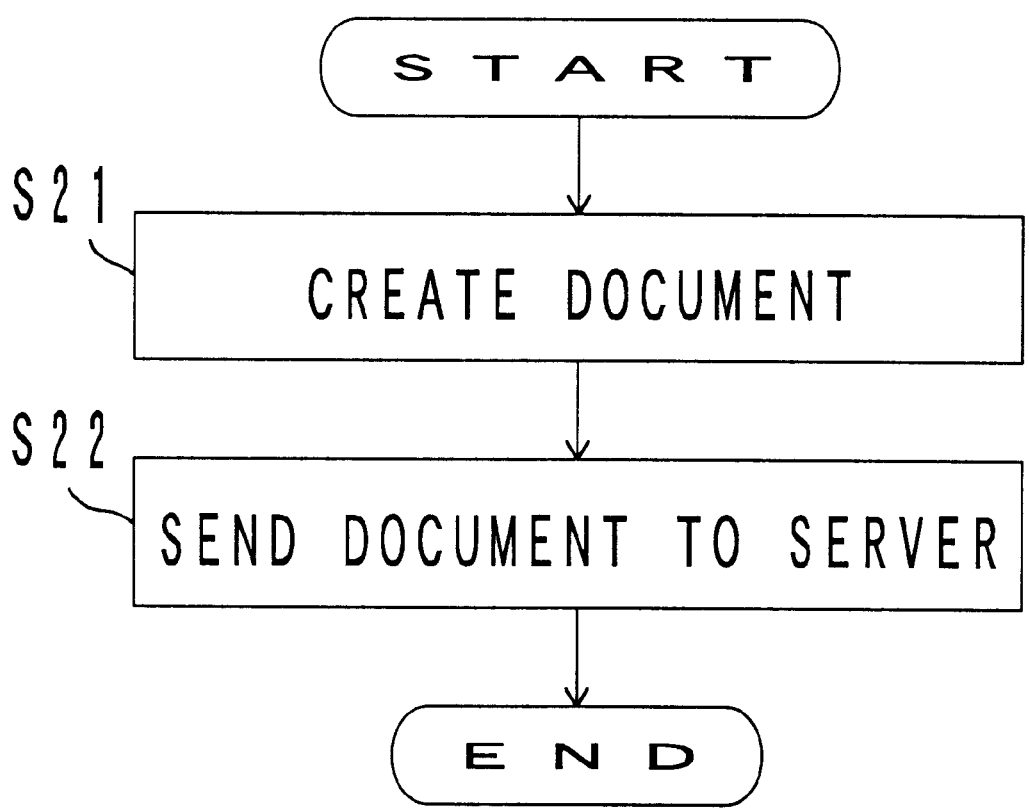
FIG. 13 is a flow diagram for requesting the transmission of a document.

FIG. 13 is a flowchart for document transmission request processing by a terminal. When the processing is started, the terminal creates a document as instructed by the corresponding person in charge (step S21) and then sends it to the server 11 (step S22), thereby ending the processing.

Figure 14:
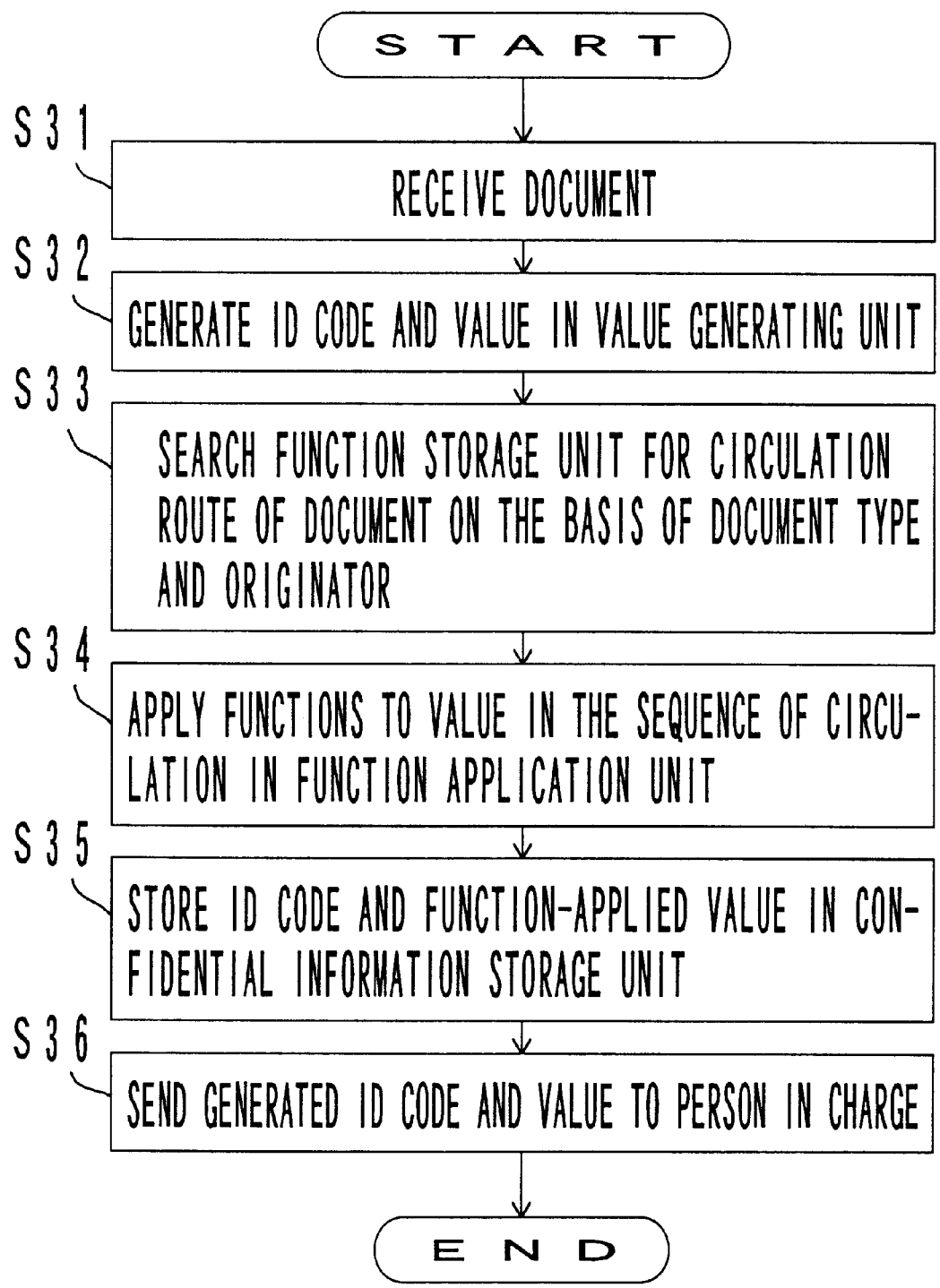
FIG. 14 is a flow diagram for generating a value.

FIG. 14 is a flowchart for the value generation processing by the server that receives the document transmission request. When the processing is started, the server 11 receives the document from the terminal (step S31) and then generates an ID code and a suitable value in its value generating unit 26 (step S32).

Next, the function application unit 27 searches the function storage unit 29 (see FIG. 3) for the circulation route for that document on the basis of the type of document and the originator's information (step S33). The function application unit 27 then applies the function of each person in charge to the value generated by the value generating unit 26 in the sequence in which that document is to be circulated through the persons in charge (step S34) and then stores the resultant value and the ID code in the confidential information storage unit 30 (step S35). The server 11 sends the ID code and the original value that was generated by the value generating unit 26 prior to function application to the terminal of the person in charge who made the request for document transmission (step S36), thereby ending the processing.

Figure 15:
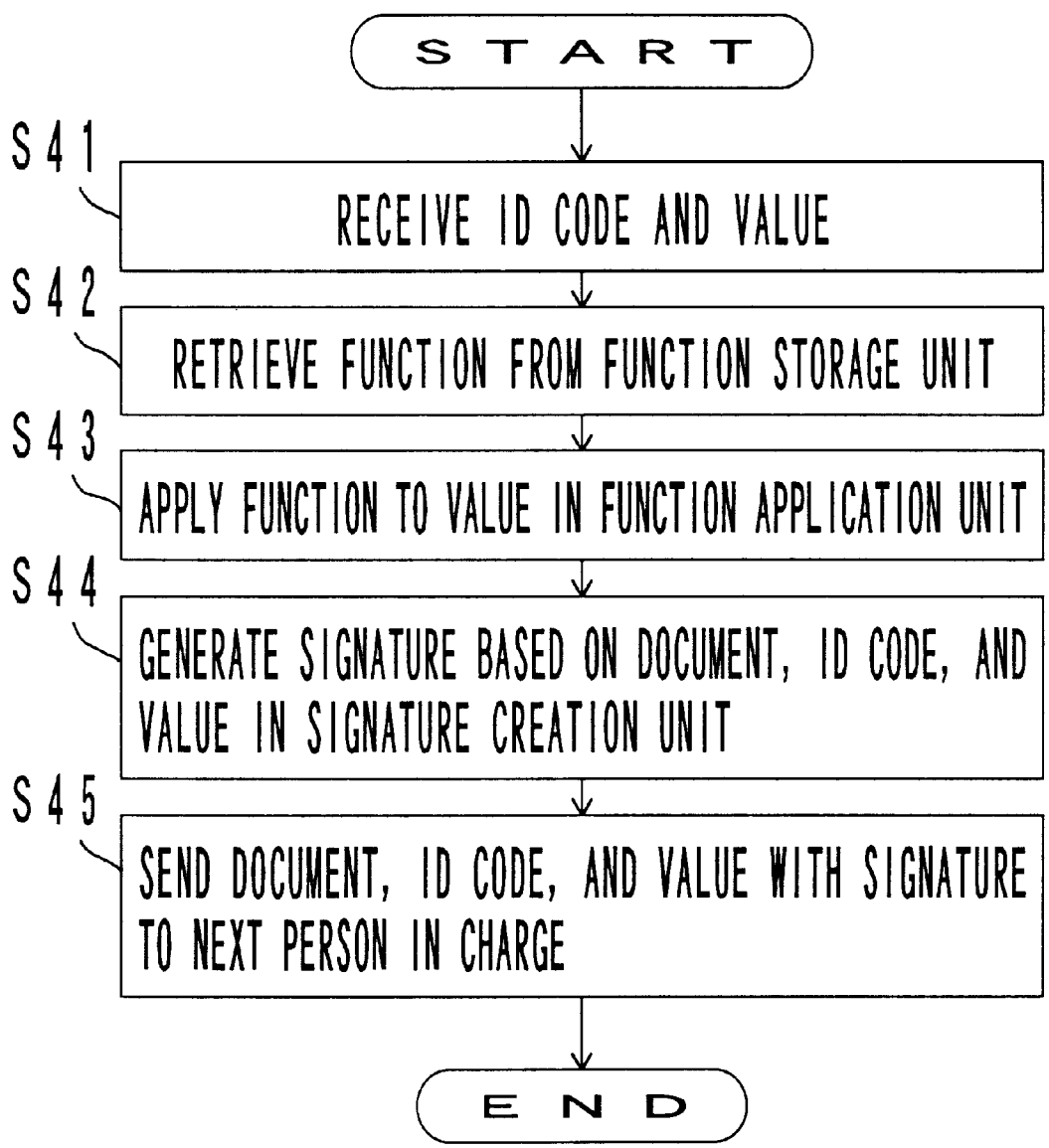
FIG. 15 is a flow diagram for the first document circulation processing.

FIG. 15 is a flowchart for the document circulation processing by the terminal of the person in charge who made the request for document transmission. When the processing is started, the terminal receives the ID code and the original value from the server 11 (step S41). The function application unit next retrieves the function from the corresponding function storage unit (step S42) and then applies it to the received value to produce a function value (step S43).

The signature creation unit generates the digital signature based on the document, the ID code, and the function value (step S44) and then sends them to the next person in charge (step S45), thereby ending the processing.

Figure 16:
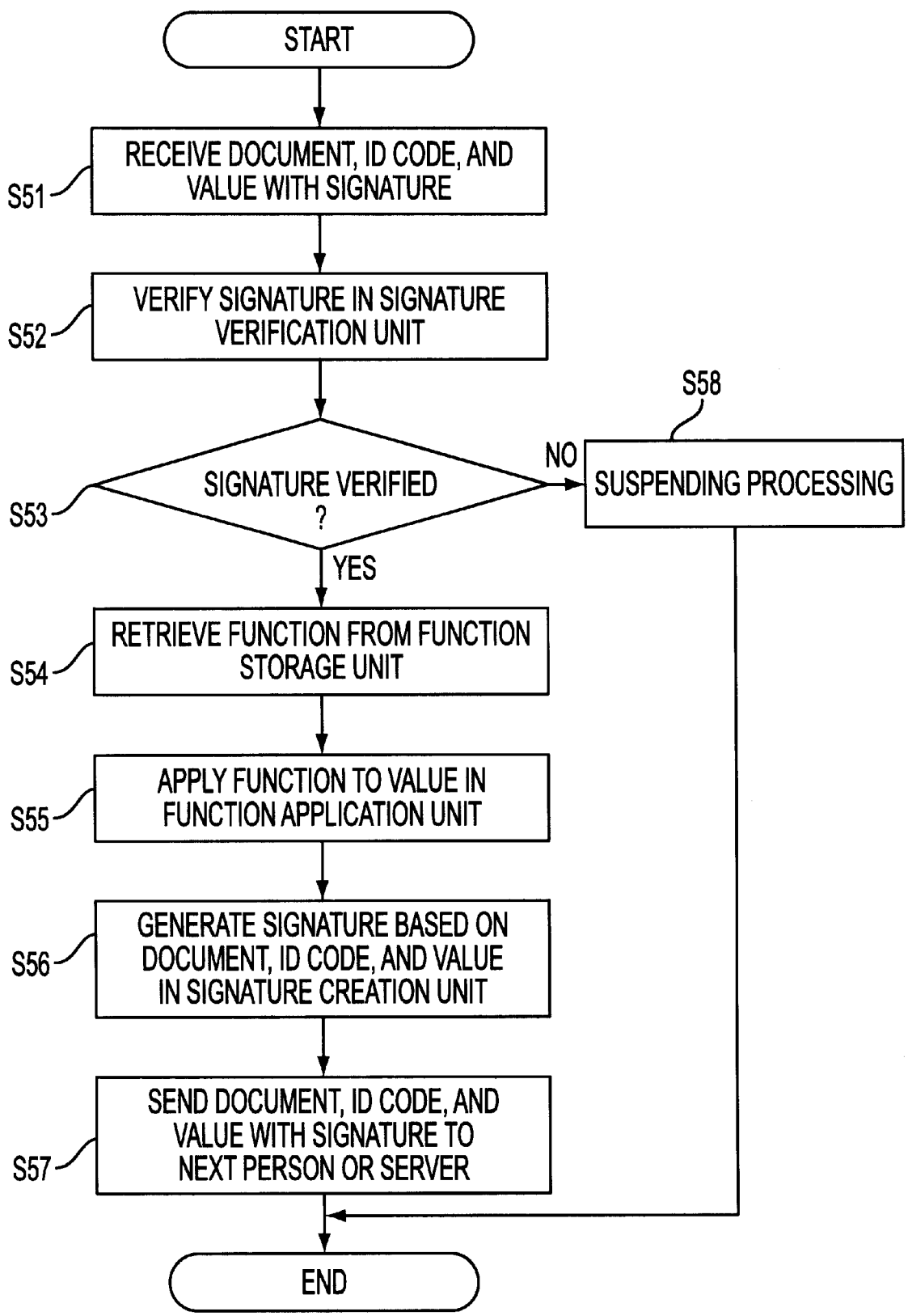
FIG. 16 is a flow diagram for the second document circulation processing.

FIG. 16 is a flowchart for the document circulation processing by the terminal of the person in charge who receives the document from the preceding terminal. When the processing is started, the terminal receives from the preceding terminal the document, the ID code, and the function value with the digital signature of the person in charge at the preceding terminal (step S51). The signature verification unit verifies the digital signature (step S52) to determine whether it is correct (step S53).

If the digital signature is verified as the correct one, then the function application unit retrieves the function from the function storage unit (step S54) and then applies it to the received function value (step S55).

The signature creation unit generates the digital signature based on the document, the ID code, and the new function value (step S56), and then sends them to the next terminal (step S57), thereby ending the processing.

If, in step S53, the digital signature is not verified as the correct one, the document circulation processing is suspended (step S58). In this case, an error procedure is carried out and the processing is then ended. In the error procedure, for example, the terminal notifies the server 11 of the incorrectness of the digital signature and the server 11 then notifies the corresponding person in charge of this error.

Figure 17:
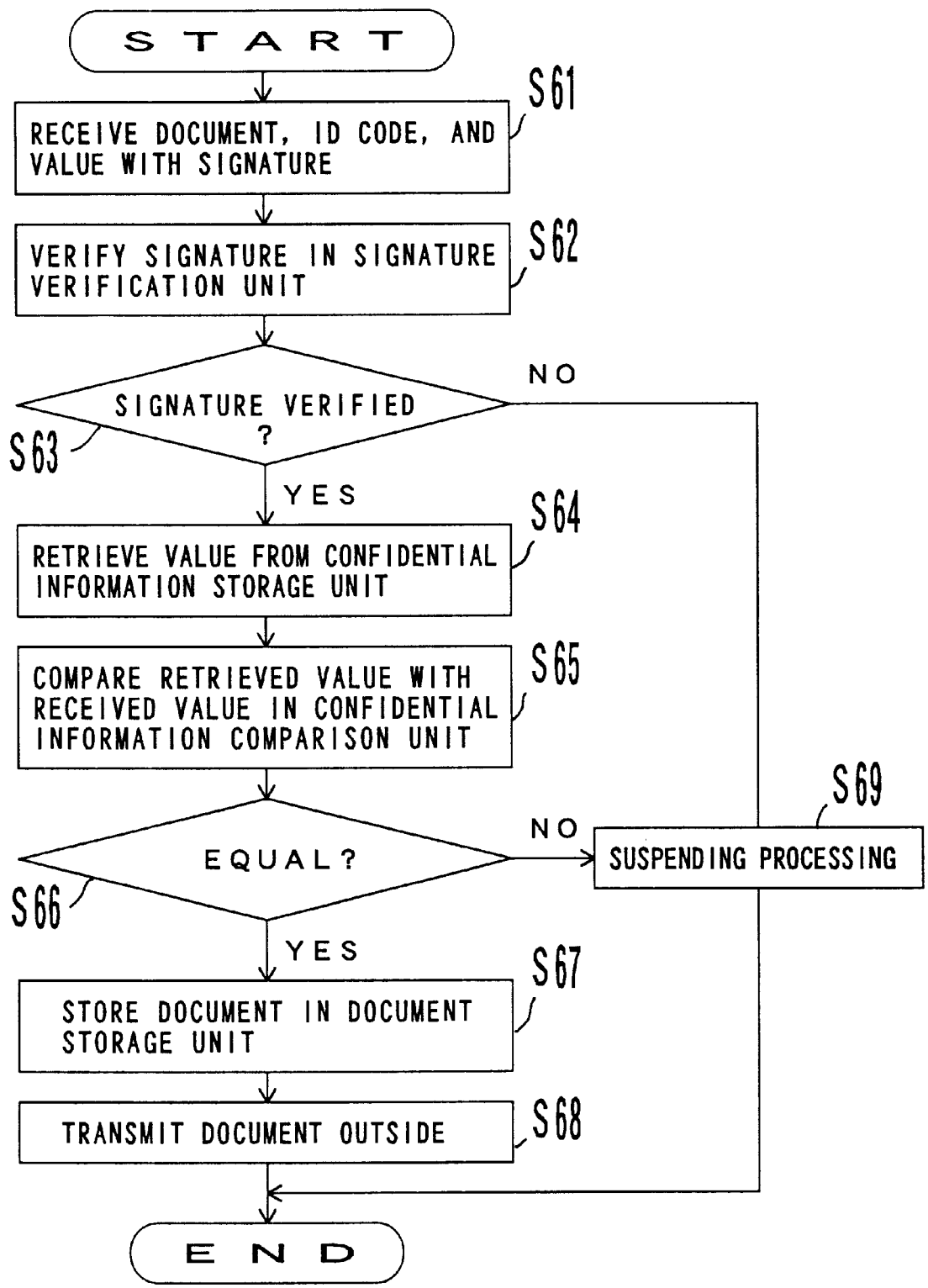
FIG. 17 is a flow diagram for the document transmission processing.

FIG. 17 is a flowchart for the document transmission processing by the server 11 when receiving the document from the last person in charge. When the processing is started, the server receives the document, the ID code, and the function value with the digital signature of the last person in charge (step S61). The signature verification unit 24 then verifies the digital signature (step S62) to determine whether it is correct (step S63).

If the digital signature is verified as the correct one, then the confidential information comparison unit 28 retrieves the function value from the confidential information storage unit 30 (step S64) and compares it with the received function value (step S65) to determine whether they are equal to each other (step S66). When they are equal, the received document is stored in the document storage unit 31 (step S67).

Next, the document transmission unit 22 transmits the document with the representative's signature outside of the company (step S68), thereby ending the processing. When, in step S63, the digital signature is not verified as the correct one, or when, in step S66, the two values are not equal to each other, the document transmission processing is suspended (step S69) and an error procedure is carried out to end the processing.

In the error procedure when the digital signature is not verified as the correct one in step S63, the corresponding person in charge is notified of incorrectness of the digital signature. In the error procedure when the two values are not equal to each other in step S66, on the other hand, the server notifies the document creator and the other persons in charge that the document has not been circulated correctly.

In the embodiment described above, each function is uniquely assigned to a post and does not vary with the person in charge. However, the function may be changed whenever the person in charge changes. By doing so, a more secure system will be implemented.

The authentication system of the present invention is applicable to techniques that authenticate the circulation and transmission of any type of digital information, such as documents, images, sound, programs, etc. Additionally, the authentication method of the present invention is applicable to techniques that authenticate the circulation and publication of any type of information, including paper media and the like.

According to the present invention, when electronic transactions are conducted between companies, it is first confirmed that digital information has been circulated correctly through persons in charge within a company, allowing the authority of each person in charge to be verified. By appending the company representative's digital signature to the document only when it has been circulated correctly, it is made possible to prevent illegal transactions in companies that transmit digital information.

The present invention provides a technique for preventing illegal transactions when electronic transactions are conducted. In the future, it is expected that companies that are going to commence electronic transactions will employ this technique.

What is claimed is:

1. An authentication system comprising:
    a circulating route storage device storing information on a predefined sequential circulating route which corresponds to a predefined sequence of information recipients and digital information to be circulated;
    a confidential information generating device generating confidential information corresponding to the digital information to be circulated and particular to the circulating route by using the information stored in said circulating route storage device;
    a confidential information storage device storing the confidential information; and
    a determining device determining whether the digital information has been circulated in the predefined sequence correctly along the circulating route based on the confidential information and information appended to the digital information by a person in charge; and
    a signature verification device verifying a digital signature of the person in charge for identifying the person in charge, the digital signature being appended to a combination of the digital information and the information appended to the digital information.

2. The authentication system according to claim 1, further comprising a transmission device automatically appending a representative's digital signature to the digital information which has been considered to have been circulated correctly and then transmitting the digital information.

3. The authentication system according to claim 1, wherein the confidential information storage device stores as the confidential information a result of an application of a function or functions that have been allocated to one or more persons in charge who handle the digital information to verification data, and the determining device makes a comparison between the confidential information and the result of the application of the function or functions to the verification data while the digital information is circulated through one or more persons in charge with the verification data appended to thereby determine whether the digital information has been circulated correctly.

4. The authentication system according to claim 3, further comprising a value generating device generating a random value as the verification data, and a communications device sending the random value to one of the persons in charge.

5. The authentication system according to claim 3, further comprising a value generating device generating a hash value of the digital information as the verification data, and a communications device sending the hash value to one of the persons in charge.

6. The authentication system according to claim 3, further comprising a function generating device generating the functions that are respectively allocated to the persons in charge, and a function storage device storing the functions with a correspondence relationship to the persons in charge.

7. The authentication system according to claim 6, wherein the function generating device generates one of a hash function, an encryption function in a secret key cryptographic algorithm, and a decryption function in a public key cryptographic algorithm for each of the functions.

8. A terminal unit comprising:
    a communications device receiving digital information to be circulated along a predefined sequential circulating route and sending the digital information to a next destination, the digital information being circulated along the circulating route represented by a predefined sequence of information recipients; and
    a conversion device converting information appended to the digital information by a first person in charge in accordance with an algorithm allocated to a second person in charge in order to generate information particular to the circulating route and used to determine whether the digital information has been circulated in the predefined sequence correctly along the circulating route;
    a signature verification device verifying a digital signature of the first person in charge for identifying the first person in charge, the digital signature being appended to a combination of the digital information and the information appended to the digital information; and
    a signature creating device appending a digital signature of the second person in charge to the digital information.

9. The terminal unit according to claim 8, further comprising a function storage device storing a function allocated to the specific person in charge as the algorithm, and wherein the conversion device applies the function to the information appended to the digital information and the communications device sends the digital information to the next destination with the result of the application of the function appended.

10. The terminal unit according to claim 9, wherein the function storage device stores the function in such a way that the function is unknown to other persons in charge.

11. The terminal unit according to claim 10, wherein the function storage device stores the function in such a way the function is unknown to the second person in charge.

12. The terminal unit according to claim 9, wherein the function storage device is removably mounted to the terminal.

13. An authentication system for use in a system in which information on intercompany transactions is circulated through one or more persons in charge within a company, comprising:
- a circulating route storage device storing information on a predefined sequential circulating route which corresponds to a predefined sequence of the one or more persons in charge and digital information to be circulated;
- a communications device receiving the digital information that has been circulated through the one or more persons in charge;
- a determining device making a determination of whether the digital information has been circulated through the persons in charge in the predefined sequence correctly based on information appended to the digital information by one of the persons in charge and particular to the circulating route, and the information stored in said circulating route storage device; and
- a signature verification device verifying a digital signature of the one of the persons in charge for identifying the one of the persons in charge, the digital signature being appended to a combination of the digital information and the information appended to the digital information.

14. The authentication system according to claim 13, further comprising a transmission device automatically appending a representative's digital signature to the digital information which has been considered to have been circulated correctly and then transmitting that digital information to another company.

15. The authentication system according to claim 13, further comprising a function allocation device allocating a function or functions to the one or more persons in charge; and wherein the determining device makes a comparison between a result of advance application of the function or functions to the verification data and a result of application of the function or functions to verification data while the digital information is circulate through the one or more persons in charge with the verification data appended to thereby determine whether the digital information has been circulated correctly.

16. A computer-readable storage medium which, when used by a computer, allows the computer to perform:
- storing information on a predefined sequential circulating route which corresponds to a predefined sequence of information recipients and digital information to be circulated;
- generating confidential information corresponding to the digital information to be circulated and particular to the circulating route by using the information on the circulating route;
- storing the confidential information;
- determining whether the digital information has been circulated in the predefined sequence correctly along the circulating route based on the confidential information and information appended to the digital information by a person in charge; and
- verifying a digital signature of the person in charge for identifying the person in charge, the digital signature being appended to a combination of the digital information and the information appended to the digital information.

17. A computer-readable storage medium which, when used by a computer, allows the computer to perform:
- receiving digital information to be circulated along a predefined sequential circulating route and sending the digital information to a next destination, the digital information being circulated along the circulating route represented by a predefined sequence of information recipients;
- converting information appended to the digital information by a first person in charge in accordance with an algorithm allocated to a second person in charge in order to generate information particular to the circulating route and used to determine whether the digital information has been circulated in the predefined sequence correctly along the circulating route;
- verifying a digital signature of a first person in charge for identifying the first person in charge, the digital signature being appended to a combination of the digital information and the information appended to the digital information; and
- appending a digital signature of the second person in charge to the digital information.

18. A computer-readable storage medium which, when used by computer that authenticates the result of circulating information relating to intercompany transactions through one or more persons in charge within a company, allows the computer to perform:
- storing information on a predefined sequential circulating route which corresponds to a predefined sequence of the one or more persons in charge and digital information to be circulated;
- receiving the digital information that has been circulated through the one or more persons in charge;
- determining whether the circulated information has been circulated in the predefined sequence correctly based on information appended to the circulated information by one of the persons in charge and particular to the circulating route, and the stored information; and
- verifying a digital signature of the one of the persons in charge for identifying the one of the persons in charge, the digital signature being appended to a combination of the digital information and the information appended to the digital information.

19. An authentication method comprising:
- generating information on a predefined sequential circulating route which corresponds to a predefined sequence of information recipients;
- generating confidential information corresponding to information to be circulated and particular to the circulating route by using the information on the circulating route;
- determining whether the information to be circulated has been circulated in the predefined sequence correctly along the circulating route based on the confidential information and information appended to the circulated information by a person in charge; and
- verifying a digital signature of the person in charge for identifying the person in charge, the digital signature being appended to a combination of the digital information and the information appended to the digital information.

20. A circulating method comprising:
- generating information on a predefined sequential circulating route which corresponds to a predefined sequence of information recipients;

receiving information to be circulated along the circulating route;

verifying a digital signature of a first person in charge for identifying the first person in charge, the digital signature being appended to a combination of the digital information and the information appended to the digital information;

converting information appended to the information to be circulated by the first person in charge in accordance with an algorithm allocated to a second person in charge in order to generate information particular to the circulating route and used to determine whether the digital information has been circulated correctly along the circulating route;

appending a digital signature of the second person in charge to the digital information; and sending the information to be circulated to a next destination with converted information appended.

21. An authentication method for authenticating the result of circulation of information relating to intercompany transactions through one or more persons in charge within a company comprising:

generating information on a predefined sequential circulating route which corresponds to a predefined sequence of the one or more persons in charge and digital information to be circulated;

receiving the digital information that has been circulated through the one or more persons in charge;

determining whether the circulated information has been circulated in the predefined sequence correctly based on information appended to the circulated information by one of the persons in charge and particular to the circulated route, and the generated information; and verifying a digital signature of the one of the persons in charge for identifying the one of the persons in charge, the digital signature being appended to the combination of the digital information and the information appended to the digital information.

22. An authentication method comprising:

generating a random number;

storing an arbitrary function in each of a plurality of terminals in a predefined sequence,
wherein the stored arbitrary functions are not a same function differentiated only by substitution of at least one constant key;

computing an expected result based on the random number and the stored functions;

receiving a document appended to a number at a respective terminal, and sending both the document and a result of the function stored in the respective terminal applied to the number to a terminal next in the sequence;

repeating said receiving in the sequence for each respective terminal and ending with a last terminal; and verifying the result from the last terminal with the expected result.

23. A computer readable storage medium storing software performing;

generating a random number;

storing an arbitrary function in each of a plurality of terminals in a predefined sequence,
wherein the stored arbitrary functions are not a same function differentiated only by substitution of at least one constant key;

computing an expected result based on the random number and the stored functions;

receiving a document appended to a number at a respective terminal, and sending both the document and a result of the function stored in the respective terminal applied to the number to a terminal next in the sequence;

repeating the receiving in the sequence for each respective terminal and ending with a last terminal; and verifying the result from the last terminal with the expected result.

24. An authentication apparatus comprising:

a random number generator generating a random number;

a plurality of terminals in a predefined sequence, each of the terminals storing an arbitrary function,
wherein the stored arbitrary functions are not a same function differentiated only by substitution of at least one constant key;

the terminals each contain a function application unit applying the function stored in a respective terminal to a received number, and transmitting a result of the applied function appended to a document to a next terminal in the sequence;

a function storage unit storing functions identical to the functions stored in each of the respective terminals;

a verification unit computing an expected result based on the random number and the functions stored in the function storage unit; and a comparator comparing the result of a final terminal with the expected result.

25. An authentication system comprising:

a circulating route storage device storing information on a predefined sequential circulating route which corresponds to a predefined sequence of information recipients and digital information to be circulated;

a confidential information generating device generating confidential information corresponding to the digital information and particular to the circulating route by applying a function or functions that have been allocated to one or more persons in charge, who handle the digital information, to verification data using the information stored in said circulating route storage device;

a confidential information storage device storing the confidential information;

a determining device determining whether the digital information has been circulated in the predefined sequence correctly along the circulating route by comparing the confidential information with a result of an application of the function or functions to the verification data when the digital information has been circulated through the one or more persons in charge with the verification data appended to and the one or more persons in charge have applied the function or functions to the verification data; and a signature verification device verifying a digital signature of one of the persons in charge for identifying the one of the persons in charge, the digital signature being appended to the combination of the digital information and the result of the application of the function or functions.

* * * * *